Jan. 27, 1970 M. BARTONIK 3,492,419

MULTIPLE IMAGE TELEVISION SYSTEM

Filed July 15, 1966 4 Sheets-Sheet 1

INVENTOR.
MIROSLAV BARTONIK

Brabin & Goldfarb

ATTORNEYS

INVENTOR.
MIROSLAV BARTONIK
Zinskin & Goldfarb
ATTORNEYS

MULTIPLE IMAGE TELEVISION SYSTEM

Filed July 15, 1966 4 Sheets-Sheet 3

INVENTOR.
MIROSLAV BARTONIK

Brisbin & Goldfarb
ATTORNEYS

Jan. 27, 1970 M. BARTONIK 3,492,419

MULTIPLE IMAGE TELEVISION SYSTEM

Filed July 15, 1966 4 Sheets-Sheet 4

INVENTOR.
MIROSLAV BARTONIK

ATTORNEYS

United States Patent Office 3,492,419

Patented Jan. 27, 1970

3,492,419

MULTIPLE IMAGE TELEVISION SYSTEM

Miroslav Bartonik, 3230 70th St., Jackson Heights, N.Y. 11372

Filed July 15, 1966, Ser. No. 565,442

Int. Cl. H04n *3/00;* H01j *29/89*

U.S. Cl. 178—6.8 10 Claims

ABSTRACT OF THE DISCLOSURE

A multiple-image television system is described comprising television camera image-taking, transmitting, selecting, editing, broadcasting and receiving systems wherein a plurality of images, either of the same subject from different angles or distances, or different subjects, can be selected and broadcast and then received on a home receiving set. In particular, three images are employed to provide a panorama-like effect.

This invention relates to a multiple-image television system, and more particularly to a television camera image-taking, transmitting, selecting, editing, broadcasting and receiving system wherein a multiplicty of images, either of the same subject from different angles or distances, or of different subjects, can be selected and broadcast and then received on a home receiving set, so that, at the option of the television director or editor, the respective images can be varied. For example, three adjacent images can show a large panorama of a single view, or a plurality of different images of the same subject, if desired taken from different viewing angles; or the plurality of different images can show the same subject from different distances and/or from different angles; or one or more of the images portrayed can be of a completely different subject, such as a news flash or a commercial.

It is therefore an object of this invention to provide a phototelegraphy system wherein images picked up by a plurality of television cameras are monitored, then certain of the images from respective cameras can be selected by the editor or director, and can be either videotaped and/or broadcast at different respective related frequencies, so as to be capable of being received on a home television receiving set on these respective frequenices.

These, together with various ancillary objects and other features of the invention which will become more apparent as the following description proceeds, are attained by this apparatus, preferred embodiments of which are illustrated in the accompanying drawings by way of example only, wherein.

In the drawings, the same reference characters are used in all figures for the same or functionally corresponding components.

Figures 1, 2A, 2B, 2C, 3:
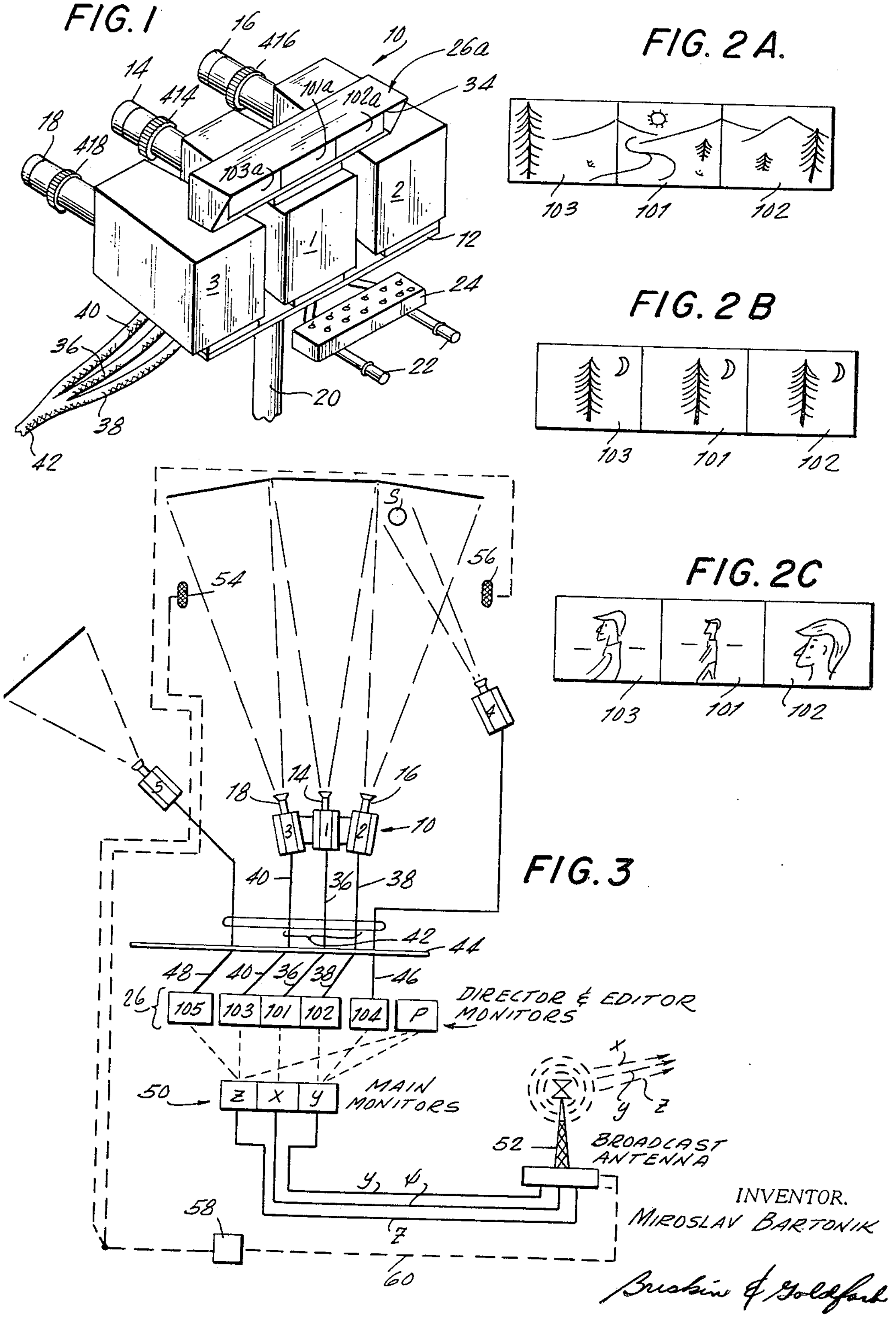
FIG. 1 is a perspective view of a multiple television camera unit with cameraman's control panel according to the invention.
FIGS. 2A, 2B and 2C represent respective typical image combinations which can be taken and broadcast by the multiple camera unit of FIG. 1 and the apparatus shown in FIG. 3.
FIG. 3 is a schematic illustration in plan view of the multiple camera installation of FIG. 1 together with other cameras, monitoring equipment and sound equipment at the phototelegraphy television studio, arranged according to the invention.

In FIG. 1 there is shown a multiple camera television photographing unit according to the invention, generally designated by the numeral 10, which comprises a plurality of cameras 1, 2, 3 mounted on a base of camera supporting platform 12. Each of the cameras 1, 2, 3 is provided with its own respective zoom lens 14, 16, 18, respectively. The camera base 12, which will be described more fully below in connection with FIGS. 5–8, is mounted on a vertical supporting column or rod 20, itself supported from a pedestal or carriage (not shown) so that the column 20 can be raised or lowered or rotated in a known manner by the cameraman to direct his cameras toward the desired subject to be photographed. As will be further explained later, camera 1 is attached to the supporting base 12 in a fixed position, while cameras 2 and 3 are capable of being pivoted in unison to the right or to the left in either direction to form equal varying angles with the axis of lens 14 of camera 1. The cameraman controls the position of the camera unit 10 by means of handles 22 for plate 12 on column 20 and from a control panel 24, which will be further explained later with respect to FIG. 4. Preferably, the cameraman, in position at handles 22, will wear earphones through which he can be instructed by the director sitting at the monitors 26 (FIG. 3). Mounted directly over and fixed to camera 1, for the convenience of the cameraman, is a smaller version of the monitor 26, and designated by the numeral 26*a*, and which comprises individual television screens or tubes 101*a*, 102*a* and 103*a* which show instantaneously the pictures being photographed through the respective lenses 14, 16, 18 of television cameras 1, 2, 3, respectively. The cameraman's monitor 26*a* is preferably provided with a shade 34 on the top and sides thereof to help prevent reflection from the sun or extraneous lighting on the viewing screens 101*a*, 102*a*, 103*a*. The respective cameras 1, 2, 3 are connected for image signal transmission by means of cables 36, 38, 40 running into a main cable 42, which may also carry other cables (not shown in FIG. 1) including one connecting the cameraman's earphones to the director's station at 26 (FIG. 3).

FIGS. 2A, 2B and 2C will now be described. The center panel of each of these three figures corresponds to the image taken by camera 1 through different distance settings of zoom lens 14 as viewed on the television image tube 101 of FIG. 3 at the director's monitor 26, and also viewed on the cameraman's monitor tube 101*a*. In a like manner, images 102 and 103 of each of the FIGURES 2A, 2B and 2C correspond to respectively different zoom lens distance settings or angular positions of cameras 2 and 3, as viewed on the director's monitor 102 and 103, and the cameraman's monitor viewing tube 102a and 103a. In the respective setting of cameras 1, 2 and 3 with relation to each other, the lenses 14, 16 and 18 are all set at equal zoom distances but at equal angles between the respective axes of lenses 16 and 18 with respect to the axis of lens 14, arranged so that the views 103, 101, 102 of FIG. 2A together show a continuous panoramic view.

The settings of the lenses 14, 16 and 18 to produce the images of FIG. 2B are such that the zoom lens distance settings are the same, and the axes of the lenses 14, 16 and 18 are substantially parallel, thus producing substantially identical images on the three viewing tubes 101, 102, 103 and on all three of the cameraman's monitors 101a, 102a, 103a.

To obtain the type of images of FIG. 2C, all three cameras 1, 2, 3 are trained upon the subject, but the lenses 14, 16 and 18 are each set at a different zoom distance setting, thus producing a close-up at 102, an overall more distant view of the subject man walking at 101, and a view of only his head and upper torso at 103 of FIG. 2C. The director and cameraman are thus able to obtain a great variety and combination of views of a particular subject and of the background, and can thus give free rein and leeway to their creative abilities and talents and permits a wide range in possibilities for artistic expression.

In FIG. 3 the reference character S represents a particular subject to be photographed against any desired indoor or outdoor background.

As will be more fully explained later, cameras 1, 2 and 3 are synchronized with each other and take pictures from a single common point location corresponding generally to the intersection of the axes of lenses 14, 16 and 18 of the cameras of unit 10. Thus, the cameras 1, 2 and 3 may photograph the image of a particular subject or view in an arc as great as 180 degrees, or even more, depending on the particular special lenses 14, 16, 18 used on the cameras. Cameras 4 and 5 may be employed as individual working cameras for photographing one or more subjects or backgrounds from special angles, as desired by the director. The camera unit 10 of FIG. 1, having the jointly mounted cameras 1, 2, 3, may be supplemented, as shown, by additional television camera units 4, 5. In the particular studio representation of FIG. 3, the camera 4 is placed somewhat closer and to one side of the subject S, whereas camera 5 is placed in a position to photograph a completely different subject or background. The cable 42 with its individual cables 36, 38 and 40 from cameras 1, 2 and 3 pass through a wall 44 into the director's room, where their respective signals are converted in a known manner to images on monitors 101, 102 and 103 of monitor group 26. Similarly, separate cables 46 and 48 from cameras 4, 5, respectively, pass through the wall 44 and their signals are transmitted to monitors 104, 105, respectively of the monitor group 26. In the director's room the row of monitors 26 is preferably arranged in the same respective position as the corresponding cameras. Thus, monitor tube 101 is centrally located, with monitor 102 at its right and monitor 103 at its left. Since camera 4 is to the right and forward of the camera unit 10 and camera 5 is to the left of camera unit 10, then the viewing monitor 104 is located to the right of monitor 102 and viewing monitor 105 is located to the left of monitor 103.

In addition to the monitors 101, 102, 103, 104, 105, an additional monitor P may be arranged in the group 26 to show a projected video tape or moving picture, a commercial, a received special news item such as a political convention or rocket blastoff, any of which the director or editor may wish to interpose at a particular time into one of the plurality of images selected to be broadcast.

The monitor tube P projects the image or picture from a projector, either moving picture films, video tape or slides, tricks or titles.

The numeral 50 in FIG. 3 indicates the editor's selected, approved image monitors, showing the images as they are to be video taped or broadcast. The image tubes 101–105 as well as the image tube P of monitor group 26 are connected with the three selected image tubes 50 through a system of switches. The connections are indicated schematically by dotted lines running between the director's monitor group 26 and the editor's monitor group 50. The particular images at the monitors 50 selected from those on the director's monitor 26 are then transmitted either onto respective telecording tape channels (not shown) or to a transmitter antenna 52 from which separate signals at respectively different frequencies $x$, $y$, $z$ are broadcast. In addition, stereo sound from respective plural microphones 54, 56 on opposite sides of the subject S, processed in a known manner through the stereo sound equipment 58, is converted to a signal, passed through a transmitting line 60 to the broadcast antenna 52 and also broadcast in a known manner on its own broadcast frequency.

In the above described manner, a greater leeway and range of artistic freedom and expression is made possible for the director and for the cameraman. The arrangement of FIG. 3 can be either interior or exterior, and one or more subjects as well as one or more backgrounds can be simultaneously photographed and simultaneously be broadcast and viewed in side-by-side relationship. For example, the concept of "meanwhile back at the ranch" can be shown by the director simultaneously on two or more respective image-viewing screens, rather than successively as has been the practice heretobefore.

The switches, indicated by dotted lines between the monitor group 26 and the selected monitor group 50 are employed to determine which of the pictures of monitor 26 will be selected and projected on the three tubes of the main line monitor 50. For example, if the director desires the picture from camera No. 4 and camera No. 5 and from projector monitor P, the editor, by using the appropriate switches, selects and causes three (from camera No. 1 and two others) of the images on the six monitor screens 26 to be projected on the three monitors 50 and to convert each of the thus selected images into a respective one of the three frequencies $x$, $y$, $z$ of the main monitor line. The director would decide what combination of images is available and which he wishes to have photographed or broadcast and then advises the cameraman through an intercom system to the cameraman's earphones the particular views he wants, and tells the editor what combination of images he wishes to have broadcast.

For example, as shown in FIG. 2A, if the editor switches on all three pictures from cameras 1, 2 and 3, a wide-angle three-tube continuous panorama picture is projected on the monitors 101, 102, 103, and then may either be recorded on video tape (not shown), or broadcast from the antenna 52 on separate wave frequencies $x$, $y$, $z$. Alternatively, the editor can mix any of the pictures of one or more cameras 1, 2, 3 with the pictures taken by camera 4 or 5, and/or with the picture from the projector or video tape monitor P.

Of course, any or all of the images of the six images on monitor 26 can be put on video tape, if desired, for furture broadcasting in a different combination than that being immediately selected at monitors 50.

The three frequencies $x$, $y$, $z$ which are broadcast from the antenna 52 are picked up by the home television aerial (FIG. 10) and transmitted separately to three separate television portions of the triple TV set (FIGS. 9 and 10), each tube of the set showing a picture corresponding to the respective frequency $x$, $y$, or $z$.

Figure 4A:
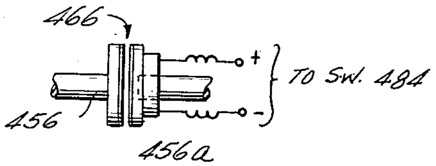
FIG. 4A illustrates a detail, in side view, showing the magnetic clutch of FIG. 4, as taken along the plane of line *4a*—*4a* of FIG. 4.
Figure 4B:
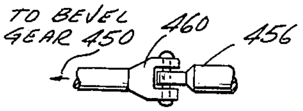
FIG. 4B is a detail, in side view, of the universal joint, as viewed along the plane of line *4b*—*4b* of FIG. 4.
Figure 4:
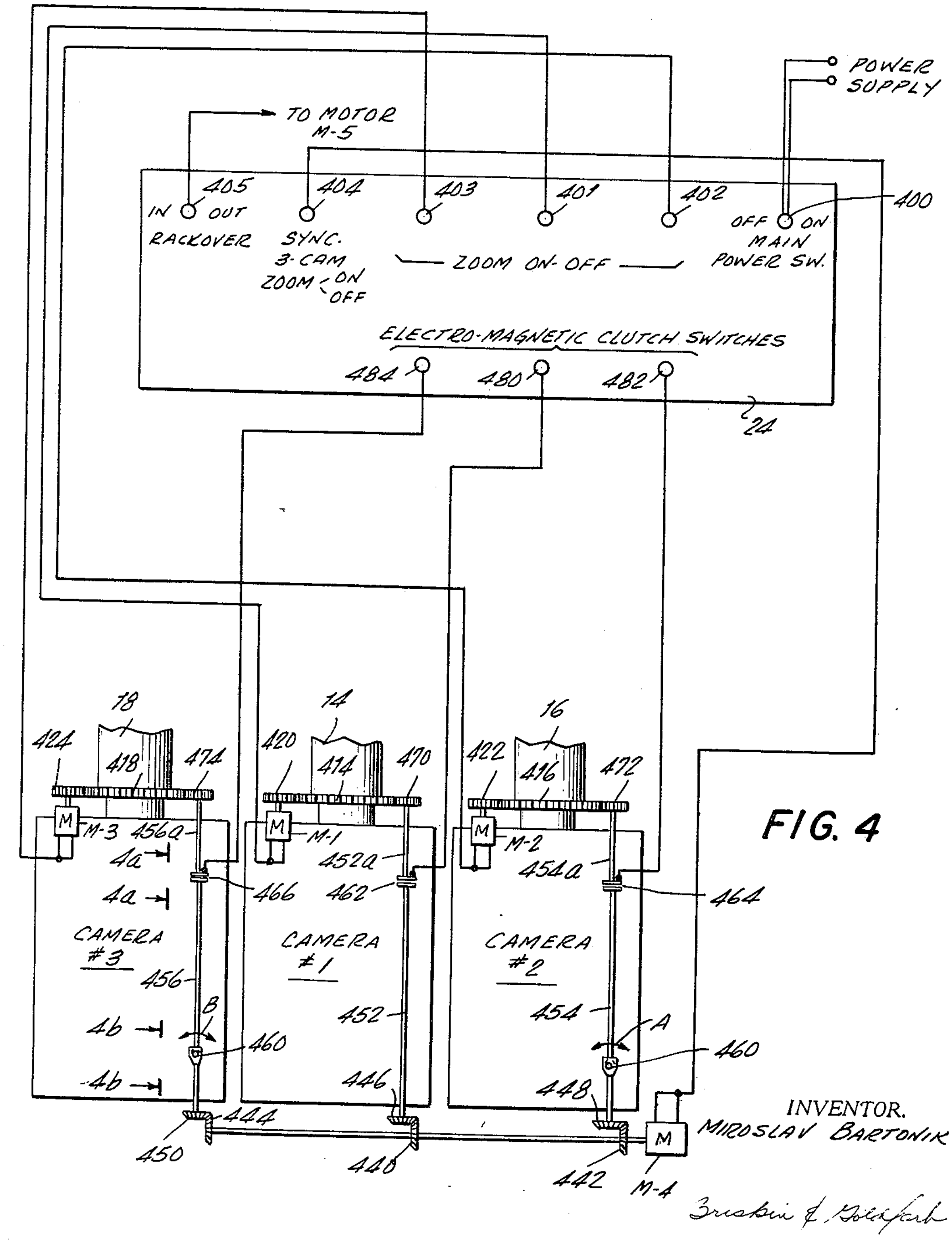
FIG. 4 is a schematic illustration showing the wiring diagram and mechanical interconnections of the control panel for the multiple camera unit of FIG. 1 and its zoom lenses and pivot drives.
Figure 5:
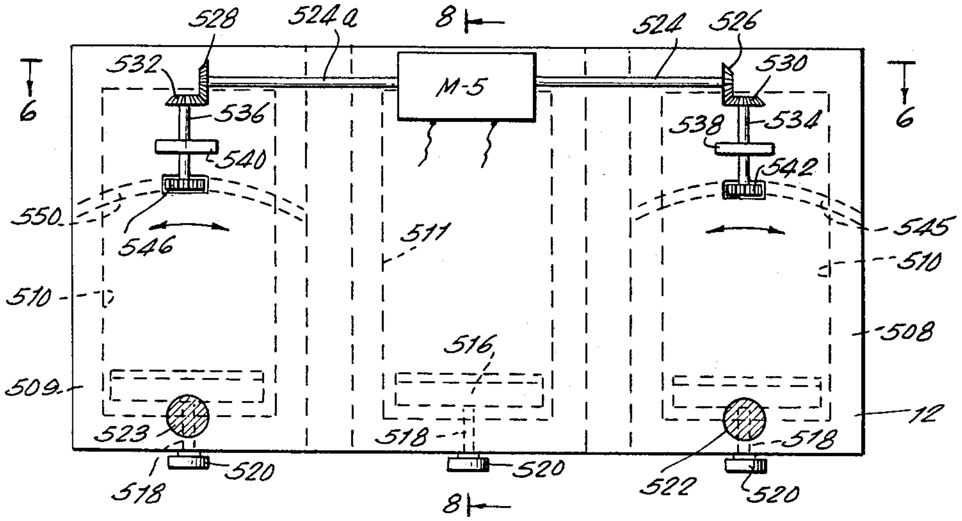
FIG. 5 is a bottom view of the multiple camera supporting platform for the triple camera unit of FIG. 1.
Figure 6:
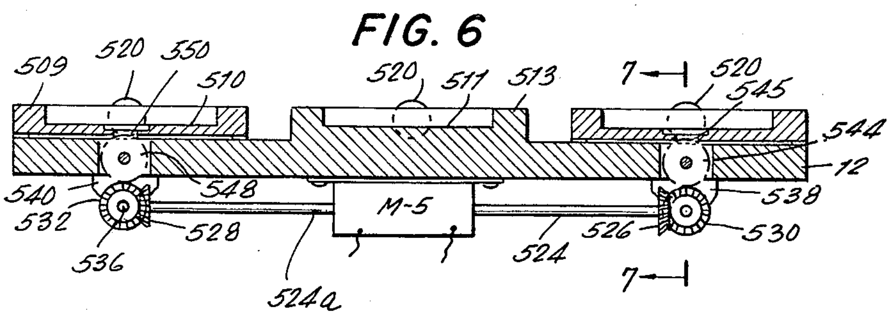
FIG. 6 is a cross section taken along the plane of line 6—6 of FIG. 5.

FIG. 4 shows the electrical and mechanical connections between the cameraman's control panel 24 and the rackover or angular positioning means and zoom system for camera 1, 2 and 3 of the television camera unit 10. The electrical power is supplied to the control panel 24 from an outside source or power supply and through the off-on toggle switch 400, located in the upper right hand corner of the control panel 24. This main switch 400 controls the power supply to all of the motors indicated in FIG. 4, namely motor M–1, M–2, M–3 and M–4. In addition, motor M–5, indicated in FIGS. 5–8, also is controlled by and obtains its power supply through main switch 400. The zoom lens bodies 14, 16, 18 are each provided with a circumferential gear 414, 416, 418, respetcively, which control the telescopic lens setting for close-up or distance shots by being rotated. The rotation, in clockwise or counterclockwise direction may be by individually controlled pinions or jointly controlled pinions. The individually controlled pinions 420, 422, 424, engage respective zoom body lens gears 414, 416, 418. These pinions 420, 422, 424 are driven by individually controlled motors M–1, M–2 and M–3, from the zoom on-off toggle switches 401, 402, 403, respectively, located in the central upper portion of the control panel 24. The motors M–1, M–2 and M–3 are small reversible low r.p.m. motors and are capable of being reversed in direction by the selected setting of the toggle switches 401, 402, 403.

The term "zoom on" refers to the movement of the telescopic lenses 14, 16 or 18 toward the subject being photographed for a close-up shot, while the expression "zoom-off" refers to movement of these lenses in the opposite direction, away from the subject being photographed, for a distance shot. Limit switches (not shown) automatically shut off the motors M–1, M–2 or M–3 respectively at each end of the zoom-on or zoom-off travel of the lens bodies 14, 16, 18.

Alternatively, instead of individual control, all three of the zoom lens bodies 14, 16, 18 can be moved together in unison for "zoom-on" or "zoom-off" directions by the single toggle switch 404 which controls a separate reversible low speed electric motor M–4, which drives a shaft 410 having three bevel gears 440, 442, 444 mounted thereon. The gears 440, 442, 444 engage respective bevel gears 446, 448 and 450 mounted at right angles to the former on shafts 452, 454 and 456 journalled on the camera base 12 for controlling the respective cameras 1, 2 and 3. The shaft 454 beneath camera 2 and the shaft 456 beneath camera 3 are each provided with a universal joint 460, shown in greater detail in FIG. 4B. The universal joint 460 permits horizontal pivotal motion of cameras 2 and 3. Since the axis of lens 14 of camera 1 remains fixed with respect to the base 12, no universal joint is shown or is necessary in the shaft 452. The pivotal motion of cameras 2 and 3 causes movement of the shaft 454 as indicated by the arrow A, while the pivotal motion of camera 3 causes corresponding movement of its shaft 456, as indicated by arrow B in FIG. 4. Electro-magnetic clutches 462, 464, 466 are provided for the respective cameras 1, 2, 3 to connect or disconnect the unison-driving zoom lens pinions 470, 472, 474 from their respective drive shafts 452, 454, 456. These electro-magnetic clutches are located along the drive shafts 452, 454, 456 to join or disconnect them with their respective extensions 452*a*, 454*a*, 456*a*.

With the electro-magnetic clutch toggle switches 480, 482, 484 all in their ON position, each of the clutches 462, 464 and 466 will be engaged. Then switching of synchronized zoom toggle switch 404 to the zoom-ON position causes motor M–4 to rotate shaft 410, which in turn rotates each of the three bevel gears 440, 442, 444, thus rotating the engaged bevel gears 446, 448, 450 and their respective shafts 452, 454 and 456. Since, as mentioned, all three of the clutches 462, 464, 466 are closed, the pinions 470, 472 and 474 will all rotate at the same speed and in the same direction to move the three zoom lens bodies 14, 16, 18 all toward the subject being photographed in the "zoom-on" direction. In an analogous manner, switching toggle switch 404 to the "zoom-OFF" position while all three clutches are engaged will cause lens bodies 14, 16, 18 to move in the "zoom-off" direction.

Instead of having all three lenses move to the zoom-on or zoom-off directions in unison, two of the three cameras can selectively be so controlled in unison by operating switch 404. This is accomplished by first disengaging one of the three clutches 462, 464, 466, as desired by the cameraman or director, merely by switching to the off position the appropriate one of the switches 480, 482 or 484.

For example, in order to achieve "zoom-on" close-up of cameras 2 and 3 simultaneously, while camera No. 1 continues to view the subject being photographed from a distance, the cameraman would switch his toggle switch 480 to "OFF" to disengage the clutch 462 of camera 1, while putting switch 482 and 484 into the "ON" position to engage respective clutches 464 and 466. Then, by switching toggle switch 404 into the "zoom-ON" position, unison lens-driving motor M–4, rotating in the required direction, turns shaft 410 and the respective bevel gear pairs of cameras 2 and 3 to rotate pinions 472 and 474, thus moving lens bodies 16 and 18 in the "zoom-ON" direction. Since clutch 462, as mentioned, would be disengaged, shaft 452 would merely turn idly and pinion 470 would not rotate. If the cameraman wished to zoom lens 14 backward in the "zoom-OFF" direction without affecting the zoom lens bodies 16 and 18 of cameras 16 and 18, he could do this by switching toggle switch 401 to the "zoom-off" direction, thus rotating motor M–1 of camera 1 to turn pinion 420 for rotating the zoom lens gear 414 in the required direction.

The "rackover" switch 405 on the control panel 24 is connected to motor M–5 (FIGS. 5–8) in order to pivot cameras 2 and 3 divergently away from (out), or return them back (in) toward the axis of lens 14 of camera 1. This feature of the invention will be discussed in further detail below.

Figures 7, 8:
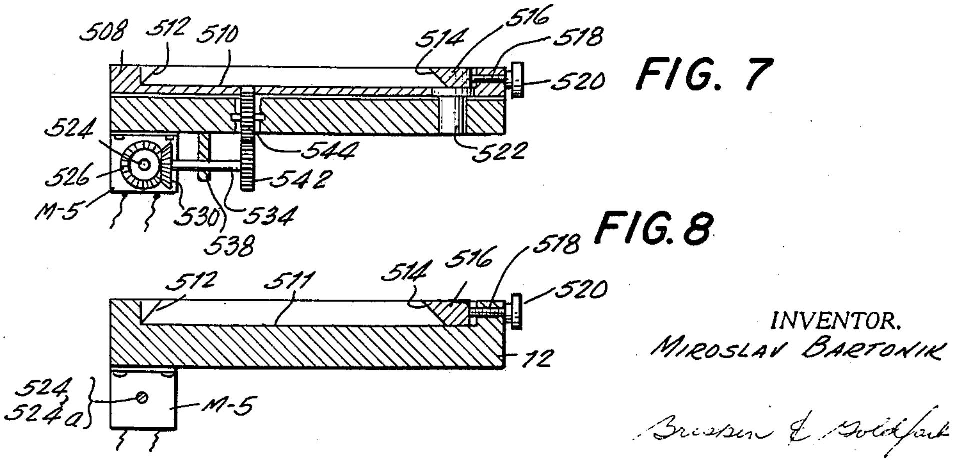
FIG. 7 is a cross section taken along the plane of line 7—7 of FIG. 6.
FIG. 8 is a cross section taken along the plane of line 8—8 of FIG. 5.

In the views of FIGS. 5–8, the camera base 12 is illustrated with the cameras 1, 2, 3 removed. The cameras are held in position in padded pockets 510 and 511 by means or surfaces 512 at the front, and movable inclined surfaces 514 at the rear, as best illustrated in FIG. 7. Inclined surfaces 512 and 514 engage corresponding sloping surfaces on the bottom portion of the camera itself (not shown). Inclined surface 514 forms part of a slidable block 516 which may be moved forwardly and backwardly by means of a threaded screw 518 having a knurled knob 520. The camera-receiving pockets 510 for cameras 2 and 3 form part of supporting frames 508 and 509 pivotally mounted on the base 12. The frames 508 thus can pivot divergently and convergently about the axes of respective pivot pins 522 and 523. On the other hand, the camera receiving pocket 511 for camera 1 is defined by a camera-receiving frame 513 which is integral with and forms part of the base 12, since camera 1 is not pivotable with respect to the base 12.

The motor M–5 for controlling the rackover or pivoting motion of the frames 508 and 509 is centrally mounted on and beneath the base 12. A double shaft 524, 524*a*, both portions of which are rotatable in the same direction by motor M–5, have bevel gears 526 and 528 mounted on respective ends on the shafts 524 and 524*a*, thus making the bevel gears 526 and 528 both rotatable in the same direction. The gears 526 and 528 engage respective bevel gears 530 and 532 mounted on respective shafts 534 and 536. The shaft 534 is journalled in a bearing bracket 538 mounted below and fixed to base 12 beneath the position of camera 2. Similarly, shaft 536 is journalled in a journal bracket 540 mounted on and beneath the base 12, below the position of camera 3. The end of shaft 534 opposite the end which carries the gear 530 has mounted thereon a spur gear 542, which engages a pinion 544 mounted in base 12 for engagement with a rack 545 of arcuate shape in the lower surface of pivotable frame 508. Similarly, the shaft 536 carries a spur gear 546 which engages pinion 548, mounted in base 12 for engagement with the arcuate rack 550 formed in the bottom surface of pivotable camera frame 509.

Operation of toggle switch 405 in the "IN" direction rotates motor M–5 in one sense of rotation. Movement of toggle switch 405 to the "OUT" direction causes motor M–5 to rotate in the opposite direction. Rotation of the M–5 with the toggle switch 405 in the "OUT" position causes shafts 524 and 524*a* to rotate in unison in the same direction, thus causing bevel gear pairs 526–530 and 528–532 to rotate in opposite directions, so that the shafts 534 and 536 rotate in opposite directions, causing spur gears 542 and 546 to rotate in opposite directions, causing pinion 544 engaging arcuate rack 545 to pivot frame 508 outwardly on pivot pin 522, and accordingly to swing therewith the camera 2 contained in the pocket 510. At the same time, spur gear 546, rotating in the opposite direction from spur gear 542, causes pinion 548, which engages the rack 550, to swing the camera frame 509 outwardly about pivot pin 523. Thus, this "rackover-out" motion causes the two cameras in pockets 510 of frames 508 and 509, respectively, to swing divergently outwardly. In an analogous manner, switching the toggle switch 405 to the "rackover-in" position causes motor M–5 to rotate in the opposite direction, and thus to move the pinions 548 and 542 in opposite directions to swing frames 509 and 508 convergently inwardly about their respective pivot pins 523 and 522. Limit switches (not shown) stop the rackover motor M–5 when the frames 508 and 509 reach the desired outer and inner limits of their travel.

It is understood, of course, that for ease of pivoting of the camera frames 508, 509, the axes of shafts 454 and 460 may intersect with the vertical axis of pivot pins 522 or 523 and that the view shown in FIG. 3 is only schematic in this respect. However, one skilled in the art will understand that various systems of linkages, universal joints and/or gear connections may be used in order to permit driving in either direction of pinion gears 472 and 474, engagement and disengagement of clutches 464 and 466, driving of the pinions 472 and 474 from shaft 410 by unison lens-driving motor M–4, while still permitting swinging action of cameras 2 and 3 divergently and return with respect to the axis of camera 1.

Figure 10:
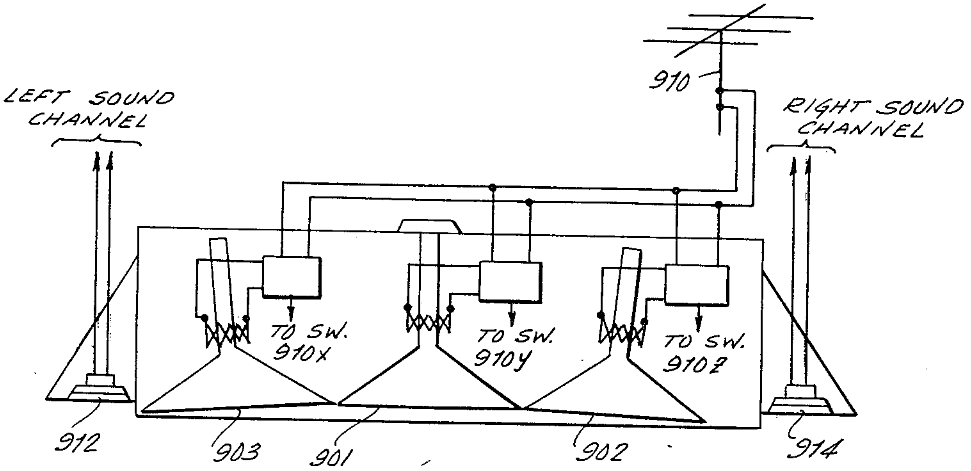
FIG. 10 is a schematic wiring diagram of the receiving set of FIG. 9.
Figure 11:
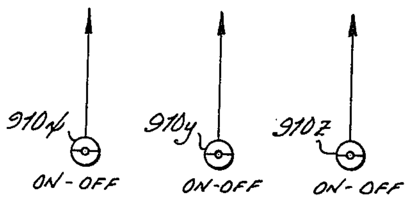
FIG. 11 illustrates details of the switches of the diagram of FIG. 10.

As above mentioned, the three signals *x, y, z* are picked up by a television receiving set aerial 910 (FIG. 10). The separate frequencies *x, y, z* may be broadcast from tower 52 (FIG. 3) within the broad assigned TV range and may be very close in frequency to each other. For example, if a particular TV station according to the invention is assigned the frequency of, say, 800 megacycles, then the other two broadcasting frequencies *y* and *z* might be 800.01 and 800.02 megacycles, respectively. All three of these frequencies *x, y, z*, could be assigned to the same broad FCC channel.

Figure 9:
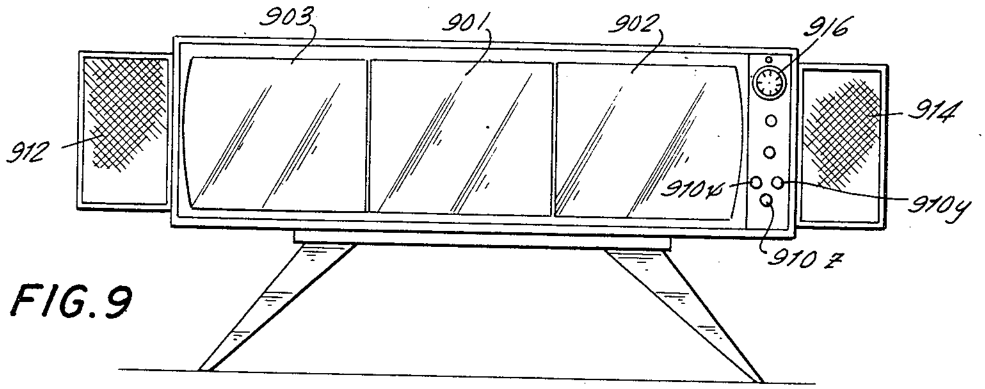
FIG. 9 is a front elevational view of a home receiving set capable of picking up the multiple broadcast signals of the device of FIG. 3.

The television receiving set shown in FIG. 9 would be provided with three television viewing tubes 903, 901, 902, each tube showing an image corresponding respectively to the images 103, 101, 102 of FIGS. 2A, 2B and 2C, or of the three selected images shown on the three monitors *z, x, y* of the monitor group 50 of FIG. 3. Sound would be received in the receiver set as stereo sound in a known manner, and the left loud-speaker 912 would emit sound corresponding to sound picked up by the microphone 54 (FIG. 3), while the loudspeaker 914 would emit sound corresponding to sound picked up by microphone 56. Each of the television tubes 903, 901 and 902 would have a separate television receiver and amplifier, arranged to pick up a particular one of the three sub-frequencies *x, y* or *z* when the main television receiver channel selector 916 is set to the main broadcast channel of a station broadcasting on the plurality of sub-frequencies *x, y, z*.

It will be obvious to those skilled in the art upon studying this disclosure, that devices and system according to my invention can be modified in various respects and hence may be embodied in apparatus other than as particularly illustrated and described herein, without departing from the essential features of my invention and within the scope of the claims annexed hereto.

I claim:

1. A television multiple image system apparatus comprising in combination, a multiple-image camera unit having a fixed central camera and pivotable flanking cameras equipped with respective zoom lenses, means for moving said cameras in directions divergent and return with respect to each other, means for moving said zoom lenses selectively in unison and individually toward and away from a predetermined subject to be photographed, and means for transmitting and broadcasting signals corresponding to the images of the respective cameras of said camera unit.

2. A television system apparatus according to claim 1, said multiple camera unit comprising a supporting base, a first camera supporting frame integral with said base and defining a first camera receiving pocket, a second camera receiving frame defining a receiving pocket for a second camera, pivot means mounting said second frame on said supporting base, said means for moving said cameras in divergent and return directions comprising a reversible rackover drive operably connected for pivoting said second camera receiving frame in selectively outward and inward directions relative to said base, and remote control means for selectively actuating said rackover drive in said directions.

3. A television system apparatus according to claim 2, including a third camera supporting frame defining a receiving pocket for a third camera, pivot means mounting said third frame on said base, said means for moving said cameras in divergent and return directions including means for moving said second and third supporting frames in unison in mutually opposite pivotal directions.

4. A television system apparatus according to claim 3, said means for moving said cameras in divergent and return directions comprising reversible motor means, arcuate rack means fixedly mounted on each of said second and third frames, and pinion means engageable with said rack means and operably connected to said motor means for being rotated by said motor means.

5. A television system apparatus according to claim 1, each of said zoom lenses having a zoom lens body, said means for moving said zoom lenses comprising a circumferential gear surrounding each respective lens body, each of said circumferential gears having a first pinion engageable therewith, reversible individual motors operably connected to said first pinions respectively for selectively driving said first pinions clockwise and counterclockwise, and individual switch means for selectively actuating said individual reversible motors to rotate in first one direction and then in the opposite direction.

6. Apparatus according to claim 5, said means for driving said zoom lenses further comprising respective second pinions engageable with each of said circumferential gears, drive means having a reversible unison lens-driving motor operably connected for rotating said second pinions, said drive means including clutch means for engaging and disengaging said unison lens-driving motor to and from said second pinions, switch means for selectively actuating said unison lens-driving motor to rotate in clockwise and counterclockwise directions, and second switch means for engaging and disengaging said clutch means.

7. Apparatus according to claim 6, further including universal joint means between said unison lens-driving motor and said clutch means for permitting the divergent and return motion of said cameras with respect to each other.

8. Apparatus according to claim 1, including a plurality of first monitor image-projecting means in side-by-side relationship and operably connected to the respective cameras of said unit for viewing the respective images photographed by said plurality of cameras.

9. Apparatus according to claim 8, including second monitor means, switch and transmission means for selectively transmitting to said second monitor means selected images from said cameras corresponding to selected images from those shown on said first monitor means.

10. Apparatus according to claim 9, said first monitor means including at least one other monitor having a connection to another image source other than a respective camera of said multiple-image camera unit, said switch and transmission means including means for selectively transmitting to said second monitor means an image corresponding to the image on said other monitor and from said other image source.

References Cited

UNITED STATES PATENTS

| | | | |
|---|---|---|---|
| 2,933,008 | 4/1960 | Barnett | 88—14 |
| 2,962,547 | 11/1960 | Douglas | 178—6 |
| 3,016,812 | 1/1962 | Chatlain | 95—11 |
| 3,051,779 | 8/1962 | Lakjer | 178—6.8 |
| 3,258,595 | 6/1966 | Galante | 178—6 X |
| 3,402,259 | 9/1968 | Takahashi | 178—7.1 |

OTHER REFERENCES

"First-Class Radiotelephone License Handbook," by Edward M. Noll, copyright 1961 and 1964, by Howard W. Sams & Co., pp. 13–14.

RICHARD MURRAY, Primary Examiner

RICHARD K. ECKERT, Jr., Assistant Examiner

U.S. Cl. X.R.

178—7.81, 7.92